US012705861B2

(12) United States Patent
Gliga et al.

(10) Patent No.: US 12,705,861 B2
(45) Date of Patent: Aug. 11, 2026

(54) METHOD AND DEVICE FOR POINT OF INTEREST (POI) DETECTION CLUSTERING USING IMAGE EMBEDDINGS

(71) Applicant: GRABTAXI HOLDINGS PTE. LTD., Singapore (SG)

(72) Inventors: Bogdan Gliga, Cluj-Napoca (RO); Adrian Ioan Margin, Cluj-Napoca (RO)

(73) Assignee: GRABTAXI HOLDINGS PTE. LTD., Singapore (SG)

( * ) Notice: Subject to any disclaimer, the term of this patent is extended or adjusted under 35 U.S.C. 154(b) by 239 days.

(21) Appl. No.: 18/719,995

(22) PCT Filed: Dec. 12, 2022

(86) PCT No.: PCT/SG2022/050900

§ 371 (c)(1),
(2) Date: Jun. 14, 2024

(87) PCT Pub. No.: WO2023/113695

PCT Pub. Date: Jun. 22, 2023

(65) Prior Publication Data

US 2025/0061687 A1 Feb. 20, 2025

(30) Foreign Application Priority Data

Dec. 16, 2021 (SG) ........................... 10202113982Y

(51) Int. Cl.
*G06V 10/762* (2022.01)
*G01C 21/00* (2006.01)
(Continued)

(52) U.S. Cl.
CPC ........ *G06V 10/762* (2022.01); *G01C 21/3811* (2020.08); *G06V 10/761* (2022.01); *G06V 30/10* (2022.01); *G06V 2201/07* (2022.01)

(58) Field of Classification Search
None
See application file for complete search history.

(56) References Cited

U.S. PATENT DOCUMENTS

| | | | |
|---|---|---|---|
| 9,129,163 | B2 | 9/2015 | Chen |
| 10,506,373 | B2 | 12/2019 | Warren et al. |

(Continued)

FOREIGN PATENT DOCUMENTS

| | | | | |
|---|---|---|---|---|
| CN | 112733781 A | 4/2021 | | |
| CN | 113792726 A | 12/2021 | | |
| WO | WO-2023111778 A1 * | 6/2023 | ............. | G06V 20/62 |

OTHER PUBLICATIONS

Villegas, D.S.—"Point-of-Interest Type Prediction using Text and Images"—arXiv—Sep. 1, 2021—pp. 1-14 (Year: 2021).*

(Continued)

*Primary Examiner* — Bernard Krasnic
(74) *Attorney, Agent, or Firm* — Buckley, Maschoff & Talwalkar LLC

(57) ABSTRACT

Aspects concern a method for point of interest (POI) detection clustering using image embeddings, the method including obtaining, using a neural network, the image embeddings from POI detections including portions of one or more images that are captured in an area of a map, in which at least one POI is detected, calculating an embedding distance between the obtained image embeddings, and recognizing texts included in the POI detections. The method further includes calculating an optical character recognition (OCR) distance between the recognized texts, calculating a final distance between the POI detections, based on the calculated embedding distance and the calculated OCR distance, and clustering the POI detections, based on the calculated final distance.

16 Claims, 4 Drawing Sheets

(51) Int. Cl.
*G06V 10/74* (2022.01)
*G06V 30/10* (2022.01)

(56) References Cited

U.S. PATENT DOCUMENTS

| | | | | |
|---|---|---|---|---|
| 11,055,569 | B2 | 7/2021 | Revaud et al. | |
| 2017/0109602 | A1 | 4/2017 | Kim | |
| 2021/0374168 | A1* | 12/2021 | Srinivasan | G06V 30/19173 |
| 2022/0335245 | A1* | 10/2022 | Missale | G06F 18/22 |

OTHER PUBLICATIONS

International Search Report and Written Opinion dated Jul. 17, 2023 which was issued in connection with PCT/SG2022/050900.
Noorian S. S. et al., Detecting, Classifying, and Mapping Retail Storefronts Using Street-level Imagery. ICMR '20: Proceedings of the 2020 International Conference on Multimedia Retrieval, Oct. 26-29, 2020, Dublin, Ireland, Jun. 8, 2020, pp. 495-501 [Retrieved on Jul. 14, 2023] <DOI: https://doi.org/10.1145/3372278.3390706> Fig. 1, Sections 3-4.
Sylvain Marchienne: "Multi-Feature Geo Clustering With DBSCAN" [Retrieved on Nov. 3, 2021 https://medium.com/@sylvainma/multi-feature-geo-clustering-with-dbscan-4857c6b932e2, Jun. 10, 2020.
Safavi et. al.: "RecPOID POI Recommendation with Friendship Aware and Deep CNN", Future Internet, 2021 MDPI.
Danon et. al.: "Unsupervised Natural Image Patch Learning", arxiv:1807.031330v1 [cs.CV] Jun. 28, 2018.

* cited by examiner

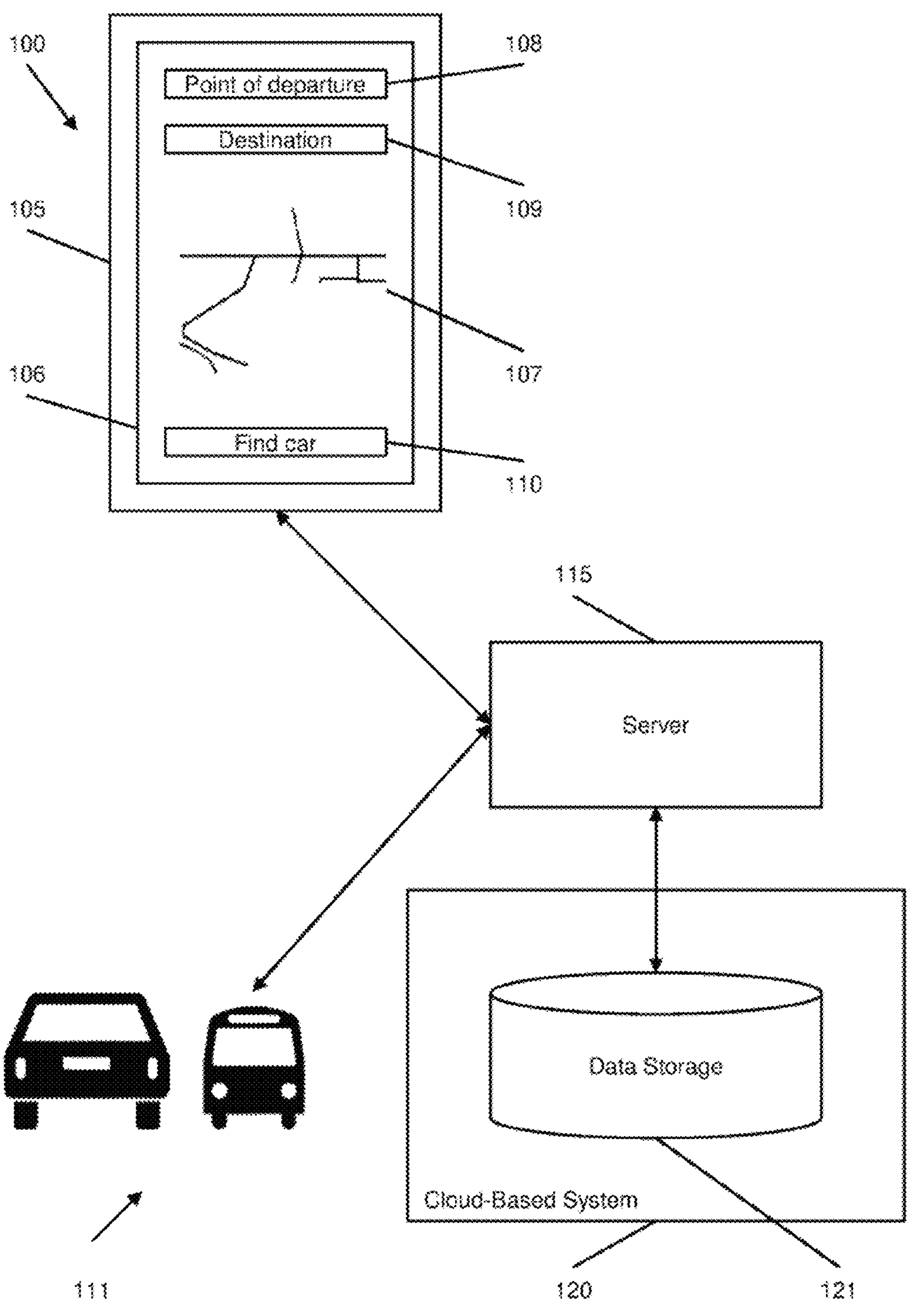
[Fig. 1]

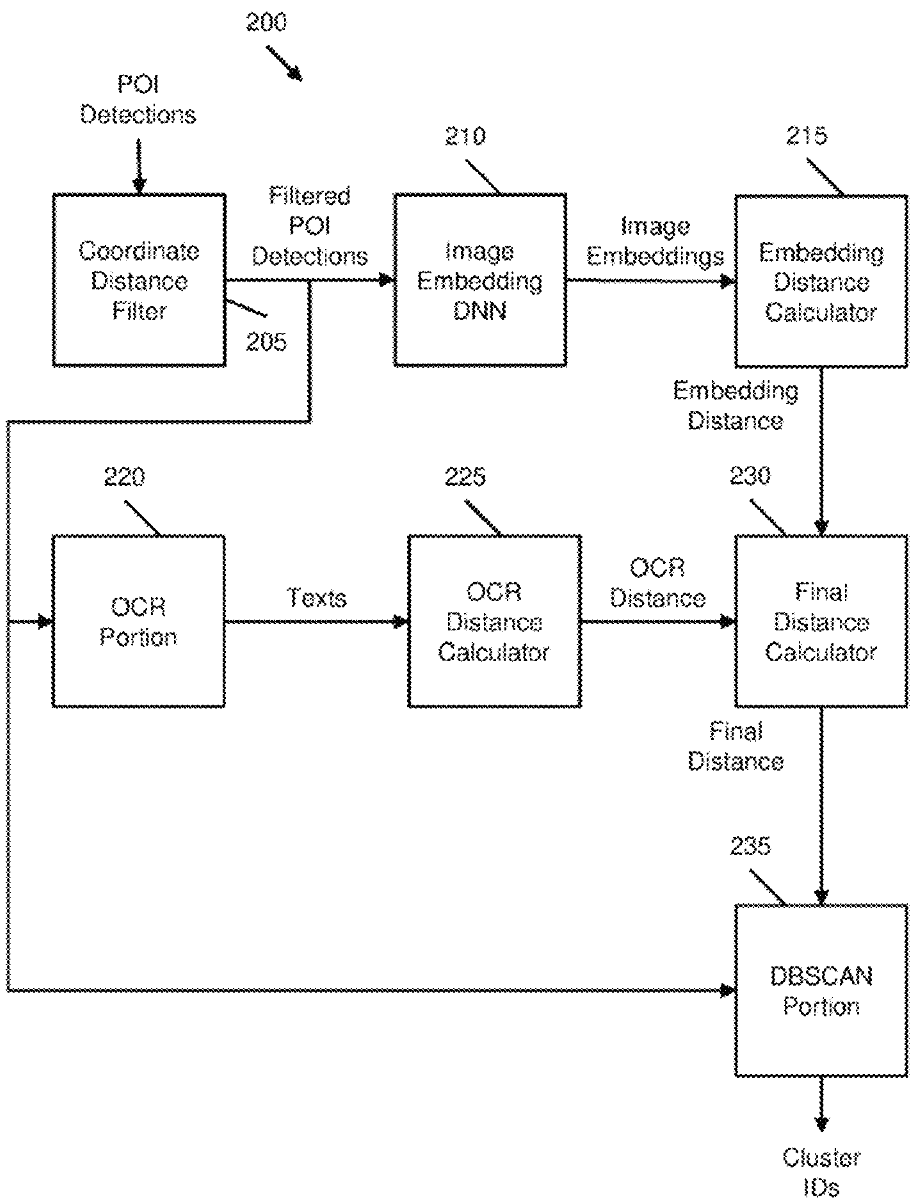
[Fig. 2]

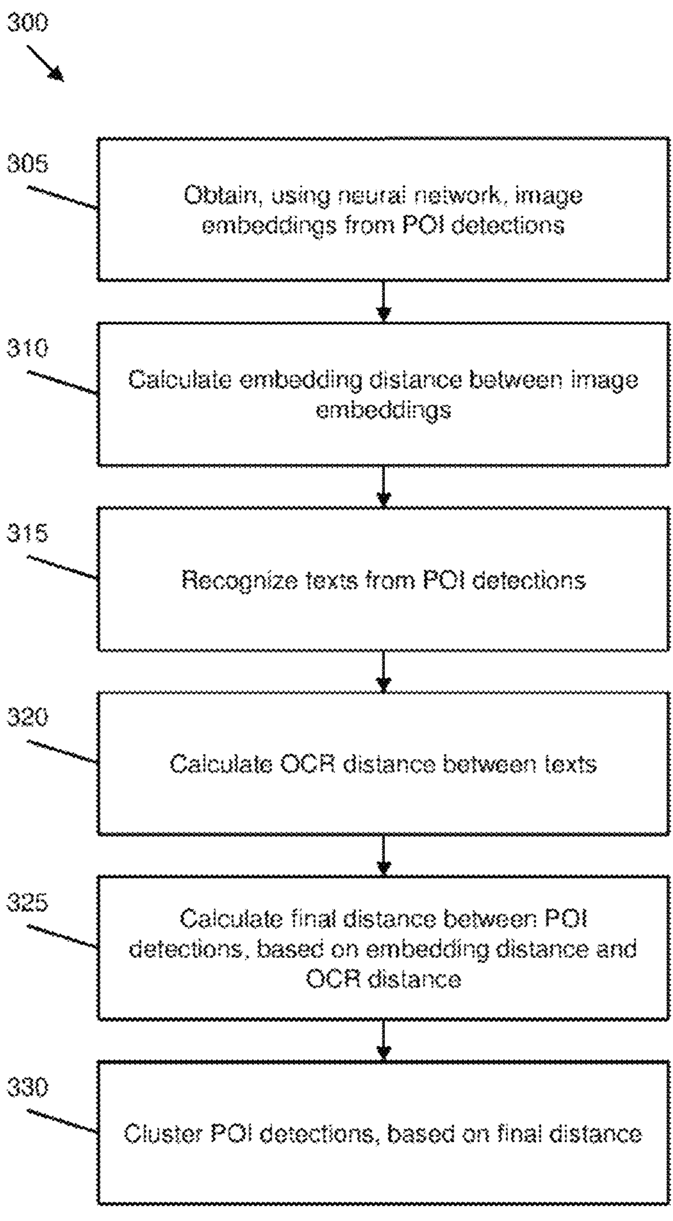
[Fig. 3]

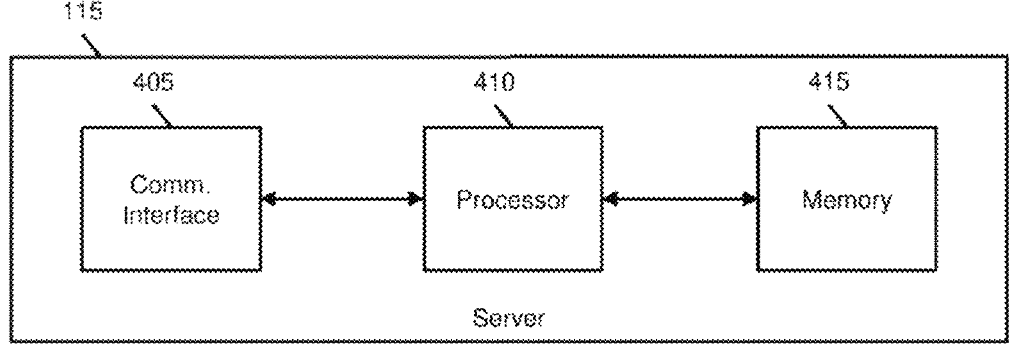
[Fig. 4]

METHOD AND DEVICE FOR POINT OF INTEREST (POI) DETECTION CLUSTERING USING IMAGE EMBEDDINGS

CROSS REFERENCE

This application is a US National Stage Application pursuant to 35 USC 371 claiming benefit of and priority to International Application No. PCT/SG2022/050900, filed on Dec. 12, 2022, and claiming priority to Singapore Application No. 10202113982Y filed on Dec. 16, 2021, each of which are hereby incorporated by reference herein in its entirety

TECHNICAL FIELD

Various aspects of this disclosure relate to methods and devices for point of interest (POI) detection clustering using image embeddings.

BACKGROUND

When judging the quality of a map, the amount of POIs included in the map may be considered. Examples of POIs can include restaurants, shops, public service buildings, etc. They may be important map features for end users as they can be often used as a start or end point for a trip, and as a result, they may impact the overall satisfaction of the end users. It may be desired for the process of adding as many POIs as possible in maps to be as efficient and fast as possible.

Currently, there exist various methods for automatically detecting different types of objects including POIs in images. This may be done using computer vision techniques. Next, the POI detections can be geo-positioned in the real world. The last step may include an operator adding the POI detections into a map. Unfortunately, due to the high number of images that might be captured at a certain location, especially in densely-populated areas, a particular POI may be detected tens or hundreds of times. This can be problematic because it is suboptimal for the operator to review hundreds of tasks that refer to the same POI, leading to a decrease in overall efficiency.

Research is being conducted to address the issue of taking thousands of individual POI detections in a certain area and determining which POI detections refer to the same physical POI. This problem can be complex due to the very nature of POIs, which are diverse in shapes and colors. A solution may need to be robust to that aspect, but also may need to be able to separate POI detections referring to two POIs having similar looking appearances. When different angles, distances and light conditions of various POI detections are considered, the problem can be even more complex. Conceptually, this problem is referred to as "object re-identification", which refers to the ability to identify a particular object from multiple viewpoints of different images.

SUMMARY

Various embodiments concern a method for POI detection clustering using image embeddings, the method including obtaining, using a neural network, the image embeddings from POI detections including portions of one or more images that are captured in an area of a map, in which at least one POI is detected, calculating an embedding distance between the obtained image embeddings, and recognizing texts included in the POI detections. The method further includes calculating an optical character recognition (OCR) distance between the recognized texts, calculating a final distance between the POI detections, based on the calculated embedding distance and the calculated OCR distance, and clustering the POI detections, based on the calculated final distance.

The method may further include calculating a coordinate distance between geographic coordinate pairs of a respective pair of the POI detections.

The method may further include determining whether the calculated coordinate distance is greater than or equal to a predetermined threshold distance.

The method may further include, based on the coordinate distance being determined to be greater than or equal to the predetermined threshold distance, filtering the POI detections by removing the respective pair of the POI detections from the POI detections.

The obtaining the image embeddings may include obtaining the image embeddings from the filtered POI detections.

The recognizing the texts may include recognizing the texts included in the filtered POI detections.

The clustering the POI detections may include clustering the filtered POI detections, based on the calculated final distance between the filtered POI detections.

The embedding distance may be a cosine distance between the obtained image embeddings, and is calculated based on a following equation:

$$\text{similarity} = \cos(\theta) = \frac{\boldsymbol{A} \cdot \boldsymbol{B}}{\|\boldsymbol{A}\| \, \|\boldsymbol{B}\|} = \frac{\sum_{i=1}^{n} A_i B_i}{\sqrt{\sum_{i=1}^{n} A_i^2} \sqrt{\sum_{i=1}^{n} B_i^2}},$$

and

A and B may denote the obtained image embeddings.

The calculating the OCR distance may include removing common words from a pair of the recognized texts.

The calculating the OCR distance may further include calculating the OCR distance between an ordering of words in both of the pair of the texts from which the common words are removed.

The calculating the final distance may include determining whether the calculated OCR distance is less than a first predetermined distance.

The calculating the final distance may further include determining whether the calculated embedding distance is less than a second predetermined distance.

The calculating the final distance may further include, based on the calculated OCR distance being determined to be less than the first predetermined distance and the calculated embedding distance being determined to be less than the second predetermined distance, setting the final distance to be zero.

The calculating the final distance may further include, based on the calculated OCR distance being determined to be greater than or equal to the first predetermined distance and/or the calculated embedding distance being determined to be greater than or equal to the second predetermined distance, setting the final distance to be the calculated embedding distance.

The clustering the POI detections may include determining whether the calculated final distance is less than a predefined threshold distance.

The clustering the POI detections may further include, based on the calculated final distance being determined to be less than the predefined threshold distance, clustering the POI detections.

The method may further include updating the map to include a POI corresponding to the clustered POI detections, and providing the updated map to a user and/or a controller configured to generate control signals for a vehicle based on the updated map.

A server may be configured to perform the method.

A computer program element may include program instructions, which, when executed by one or more processors, cause the one or more processors to perform the method.

A computer-readable medium may include program instructions, which, when executed by one or more processors, cause the one or more processors to perform the method.

BRIEF DESCRIPTION OF DRAWINGS

The invention will be better understood with reference to the detailed description when considered in conjunction with the non-limiting examples and the accompanying drawings, in which:

FIG. 1 shows a diagram illustrating a communication arrangement for usage of an e-hailing service, including a smartphone and a server;

FIG. 2 shows a block diagram of an architecture for POI detection clustering using image embeddings, according to embodiments;

FIG. 3 shows a flow diagram illustrating a method for POI detection clustering using image embeddings, according to embodiments; and FIG. 4 shows a block diagram of the server of FIG. 1, implementing the architecture of FIG. 2.

DETAILED DESCRIPTION

The following detailed description refers to the accompanying drawings that show, by way of illustration, specific details and embodiments in which the disclosure may be practiced. These embodiments are described in sufficient detail to enable those skilled in the art to practice the disclosure. Other embodiments may be utilized and structural, and logical changes may be made without departing from the scope of the disclosure. The various embodiments are not necessarily mutually exclusive, as some embodiments can be combined with one or more other embodiments to form new embodiments.

Embodiments described in the context of one of the devices or methods are analogously valid for the other devices or methods. Similarly, embodiments described in the context of a device are analogously valid for a vehicle or a method, and vice-versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

As used herein, the term "and/or" includes any and all combinations of one or more of the associated listed items.

In the following, embodiments will be described in detail.

An e-hailing app, typically used on a smartphone, allows its user to hail a taxi or also a private driver through his or her smartphone for a trip.

FIG. 1 shows a diagram of a communication arrangement 100 for usage of an e-hailing service, including a smartphone 105 and a server 115 (computer).

The smartphone 105 has a screen showing a graphical user interface (GUI) 106 of an e-hailing app that a user of the smartphone 105 previously installed on his smartphone and opened (i.e., started) to e-hail a ride (taxi or private driver).

The GUI 106 includes a map 107 of a vicinity of a position of the user, which the app may determine based on a location service, e.g., a GPS-based location service. Further, the GUI 106 includes a box for a point of departure 108, which may be set to the user's current location obtained from the location service, and a box for a destination 109, which the user may touch to enter the destination, e.g., opening a list of possible destinations. There may also be a menu (not shown) allowing the user to select various options, e.g., how to pay (cash, credit card, credit balance of the e-hailing service). When the user selects the destination and makes any necessary option selections, he or she may touch a "find car" button 110 to initiate searching of a suitable car.

For the above, the e-hailing app communicates with the server 115 of the e-hailing service via a radio connection. The server 115 may consult a memory of the server 115 or a data storage 121 having information about current locations of registered vehicles 111, about when they are expected to be free, about traffic jams, etc. From this, a processor of the server 115 selects the most suitable vehicle (if available, i.e., if a request can be fulfilled) and provides an estimate of time when a driver will be there to pick up the user, a price of a ride and how long it will take to get to the destination. The server 115 communicates this back to the smartphone 105, and the smartphone 105 displays this information on the GUI 106. The user may then accept (i.e., book) by touching a corresponding button. If the user accepts, the server 115 informs a selected one among the vehicles 111 (or, equivalently, its driver), i.e., the vehicle the server 115 has allocated for fulfilling the transport request.

It should be noted while the server 115 is described as a single server, its functionality, e.g., for providing an e-hailing service for a whole city, will in practical application typically be provided by an arrangement of multiple server computers (e.g., implementing a cloud service). Accordingly, functionalities described in the following provided by the server 115 may be understood to be provided by an arrangement of servers or server computers.

The data storage 121 may, for example, be part of a cloud-based system 120 provided by a cloud storage provider to store and access data, which it may use for taking decisions, such as information about locations of passengers and vehicles, their history (earlier bookings and routes taken), etc.

The server 115 together with the vehicles 111 provide the e-hailing service, i.e., forms a transport system. It should be noted that while the example of FIG. 1 relates to an e-hailing service where persons are transported, a transport system providing a transport service for transporting other items like fresh food and parcels may similarly be provided.

When a user makes a booking for a transport task, the server 115 may provide the smartphone 105 with an estimate of time when the transport task is completed, e.g., when the user will arrive, when food will be delivered to the user, etc.

To improve the e-hailing service or transport service, POIs may be displayed on the map 107 included in the GUI 106. The user may select the displayed POIs as the points of departure and destination. Therefore, according to embodiments, the server 115 also provides, to the smartphone 105, the map 107 including as many POIs as possible. However, as discussed above, it may be difficult for the e-mailing service or transport service to cluster or group hundreds or thousands of POIs detected in a multitude of images captured at a multitude of locations.

Embodiments described herein may efficiently solve the problem of POI reidentification in different images and from different view angles by integrating similarity techniques from both computer vision and natural language processing (NLP). In detail, the embodiments include a deep neural network (DNN) capable of creating a vectorized representation of a POI detection, i.e., a portion of an image in which a POI is detected. This is called an image embedding, the intuition being that different views of the same physical POI may be transformed by the DNN into image embeddings that are close to each other given some distance metric in a hyper-dimensional plane, while image embeddings coming from detections of two different POIs may be far away from each other. Moreover, for final results, the image embeddings are augmented with other metadata for the POI detections, such as an OCR text and/or a location, to create a final POI cluster or a group of POI detections referring to the same physical POI.

FIG. 2 shows a block diagram of an architecture 200 for POI detection clustering using image embeddings, according to embodiments.

Referring to FIG. 2, the architecture 200 includes a coordinate distance filter 205, an image embedding DNN 210, an embedding distance calculator 215, an OCR portion 220, an OCR distance calculator 225, a final distance calculator 230 and a density-based spatial clustering of application with noise (DBSCAN) portion 235.

The architecture 200 may obtain as input POI detections comprising respective portions of images captured and collected in a specific area of a map, in which at least one POI is detected. For each POI detection, its bounding box in a source image, its predicted OCR text and its predicted latitude and longitude coordinate pair can be known. For a densely-populated area with many POIs and many captured images, a number of POI detections may be in an order of thousands.

Referring again to FIG. 2, the architecture 200 may cluster or group together the individual POI detections, so that there may be one cluster for each physical POI with all POI detections referring to it. The clustering of the POI detections may be performed using an algorithm called DBSCAN, which uses a distance between every pair of POI detections. The smaller the distance, the more likely a respective pair of POI detections belong to the same cluster. For determining the distance, the following multi-step approach may be used.

The coordinate distance filter 205 calculates a coordinate distance between each pair of the POI detections. The coordinate distance may be a geographical distance between two Cartesian coordinate pairs or two longitude and latitude coordinate pairs (i.e., geographic coordinate pairs) of a respective pair of the POI detections.

The coordinate distance filer 205 further determines whether the calculated coordinate distance is greater than or equal to a predetermined threshold distance. Based on the coordinate distance between the respective pair of the POI detections being determined to be greater than or equal to the predetermined threshold distance, the coordinate distance filter 205 filters the POI detections by removing the respective pair of the POI detections from the POI detections. Otherwise, the coordinate distance filter 205 filters the POI detections by keeping the respective pair of the POI detections in the POI detections.

The respective pair of the POI detections may be removed because its two POI detections cannot refer to the same POI if their world coordinates are too far apart. The predetermined threshold distance can be 100 m between the two POI detections to conclude that they cannot refer to the same POI.

The filtering of the POI detections can help the architecture 200 downstream. This is because remaining functions, which are computationally expensive, may be performed for only one or more remaining pairs of the POI detections that are situated closer than the predetermined threshold distance to each other.

The filtered POI detections may be close to each other in the real world, but for each pair of the filtered POI detections, it may need to be determined how similar two filtered POI detections are to each other, meaning, how likely they refer to the same POI.

For the above purpose, the image embedding DNN 210 obtains image embeddings from the filtered POI detections, using a DNN that is trained to generate the image embeddings that may be used to determine a similarity between two input images. An image embedding may be a vector of numbers representing an image. This neural network-based approach may provide better results on similar image-query datasets, compared to hand-crafted features.

To train the image embedding DNN 210, a few thousand POI detections may be manually annotated to indicate which of the POI detections refer to the same POI. Then, based on the annotated POI detections, triplets of a "query image," a "positive image," and a "negative image" are generated. A pair of the "query image" and the "positive image" refer to the same POI and thus should yield similar image embeddings when inputted in the image embedding DNN 210, while a pair of the "query image" and the "negative image" do not refer to the same POI and should yield different image embeddings when inputted in the image embedding DNN 210.

Next, each generated triplet is inputted into the image embedding DNN 210 to generate an image embedding for each member of a respective triplet. A first cosine distance is calculated between the generated image embeddings of the pair of the "query image" and the "positive image," and a second cosine distance is calculated between the generated image embeddings of the pair of the "query image" and the "negative image." A loss is calculated based on inputting the calculated first and second cosine distances into a predetermined loss function that minimizes the first cosine distance and increases the second cosine distance. Weights of the image embedding DNN 210 are then changed to minimize the calculated loss, thus training the image embedding DNN 210.

The embedding distance calculator 215 calculates an embedding distance between each pair of the filtered POI detections, by computing a cosine distance between each pair of the obtained image embeddings, based on the following equation:

$$\text{similarity} = \cos(\theta) = \frac{\boldsymbol{A} \cdot \boldsymbol{B}}{\|\boldsymbol{A}\| \, \|\boldsymbol{B}\|} = \frac{\sum_{i=1}^{n} A_i B_i}{\sqrt{\sum_{i=1}^{n} A_i^2} \sqrt{\sum_{i=1}^{n} B_i^2}} \tag{1}$$

A ($A_i$) and B ($B_i$) denote a pair of the image embeddings.

The OCR portion 220 recognizes texts or input strings respectively included in the filtered POI detections, using a predetermined OCR model.

One common element of POIs is that there likely may be text appearing on them. Thus, checking if two POI detections include the same text can be useful in determining if the two POI detections refer to the same POI. For example, if the two POI detections have similar latitude and longitude coordinates and both have "Bank of India" written on them, it is likely that the two POI detections refer to the same POI. The challenge here is to select an algorithm that can measure a similarity between two texts, but also consider that there might be big spelling mistakes. The mistakes may appear for multiple reasons: occlusions, a glare, a distance to a POI being too big and/or errors in the OCR model itself.

For the above reason, the OCR distance calculator 225 calculates an OCR distance between each pair of the recognized texts. In detail, the OCR distance calculator 225 performs a token set ratio on each pair of the recognized texts, which removes common (same) tokens or words from a respective pair of the recognized texts. The OCR distance calculator 225 then calculates an edit distance or OCR distance between some ordering of tokens or words in both input strings of the respective pair of the texts from which the common tokens are removed.

The final distance calculator 230 calculates a final distance between each pair of the filtered POI detections, based on the calculated embedding distance and the calculated OCR distance. For example, if the calculated OCR distance is less than a first predetermined threshold distance (i.e., a respective pair of the recognized POI detections texts are similar) and if the calculated embedding distance is less than a second predetermined threshold distance (i.e., a respective pair of the obtained image embeddings are similar from a visual point of view), then it is safe to say that a respective pair of the filtered POI detections refer to the same POI, and the final distance calculator 230 may set the final distance between the respective pair of the filtered POI detections to be zero. Otherwise, the final distance calculator 230 may set the final distance between the respective pair of the filtered POI detections to be the calculated embedding distance between the respective pair of the obtained image embeddings.

The DBSCAN portion 235 clusters the filtered POI detections, based on the calculated final distance between each pair of the filtered POI detections. In detail, the DBSCAN portion 235 obtains cluster identifiers (IDs) respectively for the filtered POI detections, based on the calculated final distance between each pair of the filtered POI detections. Each of the cluster IDs indicates which cluster of POI detections a POI detection is clustered or grouped into, and thus indicates which POI the POI detection is referring to. For example, the DBSCAN portion 235 may obtain a first cluster ID for a first cluster of POI detections having a final distance therebetween that is less than a predefined threshold distance, and may obtain a second cluster ID for a second cluster of POI detections having the final distance therebetween that is less than the predefined threshold distance. The map may be updated to include POIs respectively corresponding to the first cluster ID and the second cluster ID, and the updated map can be provided to a user and/or a controller configured to generate control signals for a vehicle.

As a result of the above-described approach, an operator may validate a single POI cluster (including multiple images) when adding newly predicted information or a POI into a map, instead of pointlessly validating hundreds of POI detections referring to the same POI. This can lead to an increase in validation speed and a decrease in validation cost, proportional to a number of POI detections in each cluster. Moreover, the approach may also lead to a reduction in possible false positive detections, as the number of POI detections per cluster can be used as a confidence metric, further optimizing an entire workflow by prioritizing high-confidence detections.

FIG. 3 shows a flow diagram illustrating a method 300 for POI detection clustering using image embeddings, according to embodiments.

In operation 305, the method 300 includes obtaining, using a neural network, the image embeddings from POI detections including portions of one or more images that are captured in an area of a map, in which at least one POI is detected.

In operation 310, the method 300 includes calculating an embedding distance between the obtained image embeddings.

In operation 315, the method 300 includes recognizing texts included in the POI detections.

In operation 320, the method 300 includes calculating an OCR distance between the recognized texts.

In operation 325, the method 300 includes calculating a final distance between the POI detections, based on the calculated embedding distance and the calculated OCR distance.

In operation 330, the method 300 includes clustering the POI detections, based on the calculated final distance.

The method 300 may further include calculating a coordinate distance between geographic coordinate pairs of a respective pair of the POI detections.

The method 300 may further include determining whether the calculated coordinate distance is greater than or equal to a predetermined threshold distance.

The method 300 may further include, based on the coordinate distance being determined to be greater than or equal to the predetermined threshold distance, filtering the POI detections by removing the respective pair of the POI detections from the POI detections.

The obtaining the image embeddings may include obtaining the image embeddings from the filtered POI detections.

The recognizing the texts may include recognizing the texts included in the filtered POI detections.

The clustering the POI detections may include clustering the filtered POI detections, based on the calculated final distance between the filtered POI detections.

The embedding distance may be a cosine distance between the obtained image embeddings, and is calculated based on a following equation:

$$\text{similarity} = \cos(\theta) = \frac{\boldsymbol{A} \cdot \boldsymbol{B}}{\|\boldsymbol{A}\| \, \|\boldsymbol{B}\|} = \frac{\sum_{i=1}^{n} A_i B_i}{\sqrt{\sum_{i=1}^{n} A_i^2} \sqrt{\sum_{i=1}^{n} B_i^2}},$$

and

A and B may denote the obtained image embeddings.

The calculating the OCR distance may include removing common words from a pair of the recognized texts.

The calculating the OCR distance may further include calculating the OCR distance between an ordering of words in both of the pair of the texts from which the common words are removed.

The calculating the final distance may include determining whether the calculated OCR distance is less than a first predetermined distance.

The calculating the final distance may further include determining whether the calculated embedding distance is less than a second predetermined distance.

The calculating the final distance may further include, based on the calculated OCR distance being determined to be less than the first predetermined distance and the calculated embedding distance being determined to be less than the second predetermined distance, setting the final distance to be zero.

The calculating the final distance may further include, based on the calculated OCR distance being determined to be greater than or equal to the first predetermined distance and/or the calculated embedding distance being determined to be greater than or equal to the second predetermined distance, setting the final distance to be the calculated embedding distance.

The clustering the POI detections may include determining whether the calculated final distance is less than a predefined threshold distance.

The clustering the POI detections may further include, based on the calculated final distance being determined to be less than the predefined threshold distance, clustering the POI detections.

The method 300 may further include updating the map to include a POI corresponding to the clustered POI detections, and providing the updated map to a user and/or a controller configured to generate control signals for a vehicle based on the updated map.

The method 300 of FIG. 3 is, for example, carried out by the server 115 as illustrated in FIG. 4.

FIG. 4 shows a block diagram of the server 115 of FIG. 1, implementing the architecture 200 of FIG. 2.

Referring to FIG. 4, the server 115 may be a server computer that includes a communication interface 405, a processor 410 and a memory 415.

The communication interface 405 may serve as a hardware and/or software interface that can, for example, transfer commands and/or data between a user and/or external devices and other components of the server 115. The communication interface 405 may further set up communication between the server 115 and the external devices, such as the smartphone 105 of FIG. 1. The communication interface 405 may be connected with a network through wireless or wired communication architecture to communicate with the external devices. The communication interface 405 may be a wired or wireless transceiver or any other component for transmitting and receiving signals.

The processor 410 may include one or more of a central processing unit (CPU), a graphics processor unit (GPU), an accelerated processing unit (APU), a many integrated core (MIC), a field-programmable gate array (FPGA), and/or a digital signal processor (DSP). The processor 410 may be a general-purpose controller that performs control of any one or any combination of the other components of the server 115, and/or performs an operation or data processing relating to communication. The processor 410 may execute one or more programs stored in the memory 415.

The memory 415 may include a volatile and/or non-volatile memory. The memory 415 stores information, such as one or more of commands, data, programs (one or more instructions), applications, etc., which are related to at least one other component of the server 115 and for driving and controlling the server 115. For example, commands and/or data may formulate an operating system (OS). Information stored in the memory 415 may be executed by the processor 410. The memory 415 may further store information that is executed by the processor 410 to perform functions and operations described with respect to FIGS. 1-3 above.

Referring again to FIGS. 1, 2 and 4, the processor 410 included in the server 115 may acquire, from a camera (not shown), one or more images that are captured in an area of a map, and may perform POI detection on the acquired images to obtain POI detections. The processor 410 may then perform functions as described above with respect to the architecture 200, to process and cluster the obtained POI detections with respective POIs.

In this example, the processor 410 may update a map to include a POI corresponding to the clustered POI detections, e.g., the first cluster of POI detections having the first cluster ID. The processor 410 may provide the updated map to a user of the smartphone 105. Further, the processor 410 may provide the updated map to a controller of one among the vehicles 111. The controller may be configured to generate control signals for the one among the vehicles 111, based on the updated map. For example, the control signals may control generation and display of navigation information, or may be driving signals to control the one among the vehicles 111 as an autonomous car. The above-described aspects may improve user convenience and control, while maintaining server efficiency.

The methods described herein may be performed and the various processing or computation units and the devices and computing entities described herein may be implemented by one or more circuits. In an embodiment, a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g., a microprocessor. A "circuit" may also be software being implemented or executed by a processor, e.g., any kind of computer program, e.g., a computer program using a virtual machine code. Any other kind of implementation of the respective functions that are described herein may also be understood as a "circuit" in accordance with an alternative embodiment.

While the disclosure has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes that come within the meaning and range of equivalency of the claims are therefore intended to be embraced.

The invention claimed is:

1. A method for point of interest (POI) detection clustering using image embeddings, the method comprising:

obtaining, using a neural network, the image embeddings from filtered POI detections, the filtered POI detections comprising portions of one or more images that are captured in an area of a map, in which POIs are detected, wherein the filtered POI detections are obtained by calculating a coordinate distance between geographic coordinate pairs of each pair of the POI detections and removing, based on the coordinate distance, a respective pair of the POI detections from the POI detections;

calculating an embedding distance between the obtained image embeddings; recognizing texts included in the filtered POI detections;

calculating an optical character recognition (OCR) distance between the recognized texts;

calculating a final distance between the POI detections, based on the calculated embedding distance and the calculated OCR distance; and clustering the POI detections, based on the calculated final distance;

updating the map to comprise a POI corresponding to the clustered POI detections; and providing the updated map for generating control signals for a vehicle based on the updated map.

2. The method of claim 1, further comprising determining whether the calculated coordinate distance is greater than or equal to a predetermined threshold distance.

3. The method of claim 2, wherein the filtered POI detections includes removing the respective pair of the POI detections from the POI detections is performed based on the coordinate distance being determined to be greater than or equal to the predetermined threshold distance.

4. The method of claim 3, wherein the clustering the POI detections comprises clustering the filtered POI detections, based on the calculated final distance between the filtered POI detections.

5. The method of claim 1, wherein the embedding distance is a cosine distance between the obtained image embeddings, and is calculated based on a following equation:

$$\text{similarity} = \cos(\theta) = \frac{A \cdot B}{\|A\| \, \|B\|} = \frac{\sum_{i=1}^{n} A_i B_i}{\sqrt{\sum_{i=1}^{n} A_i^2} \sqrt{\sum_{i=1}^{n} B_i^2}},$$

and

A and B denote the obtained image embeddings.

6. The method of claim 1 wherein the calculating the OCR distance comprises removing common words from a pair of the recognized texts.

7. The method of claim 6, wherein the calculating the OCR distance further comprises calculating the OCR distance between an ordering of words in both of the pair of the recognized texts from which the common words are removed.

8. The method of claim 1, wherein the calculating the final distance comprises determining whether the calculated OCR distance is less than a first predetermined distance.

9. The method of claim 8, wherein the calculating the final distance further comprises determining whether the calculated embedding distance is less than a second predetermined distance.

10. The method of claim 9, wherein the calculating the final distance further comprises, based on the calculated OCR distance being determined to be less than the first predetermined distance and the calculated embedding distance being determined to be less than the second predetermined distance, setting the final distance to be zero.

11. The method of claim 9, wherein the calculating the final distance further comprises, based on the calculated OCR distance being determined to be greater than or equal to the first predetermined distance and/or the calculated embedding distance being determined to be greater than or equal to the second predetermined distance, setting the final distance to be the calculated embedding distance.

12. The method of claim 1, wherein the clustering the POI detections comprises determining whether the calculated final distance is less than a predefined threshold distance.

13. The method of claim 12, wherein the clustering the POI detections further comprises, based on the calculated final distance being determined to be less than the predefined threshold distance, clustering the POI detections.

14. The method of claim 1, further comprising:

providing the updated map to at least one of a user and a controller configured to generate control signals for a vehicle based on the updated map.

15. A server configured to perform the method of claim 1.

16. A non-transitory computer-readable medium comprising program instructions, which, when executed by one or more processors, cause the one or more processors to perform the method of claim 1.

* * * * *